United States Patent [19]

Hanington

[11] Patent Number: 5,754,414
[45] Date of Patent: May 19, 1998

[54] SELF-COMPENSATING SWITCHING POWER CONVERTER

[76] Inventor: Gary J. Hanington, 4411 Willows Rd., Alpine, Calif. 90901

[21] Appl. No.: 606,147

[22] Filed: Feb. 23, 1996

[51] Int. Cl.⁶ .......................... H02M 3/335; G05F 1/563
[52] U.S. Cl. ........................... 363/21; 363/17; 323/282
[58] Field of Search .................... 363/21, 17, 98; 323/282, 285, 280

[56] References Cited

U.S. PATENT DOCUMENTS

| | | | |
|---|---|---|---|
| 4,616,300 | 10/1986 | Santelmann, Jr. | 363/21 |
| 4,725,936 | 2/1988 | Nakajima et al. | 363/21 |
| 4,823,070 | 4/1989 | Nelson | 323/285 |
| 5,291,387 | 3/1994 | Oshima | 363/56 |
| 5,305,192 | 4/1994 | Bonte et al. | 363/21 |

*Primary Examiner*—Robert Nappi
*Assistant Examiner*—Rajnikant B. Patel
*Attorney, Agent, or Firm*—Gray Cary Ware & Freidenrich

[57] ABSTRACT

A self-compensating high voltage switched power converter monitors the variations in real time of the resonant frequency of the converter, and controls a switching transistor of the converter to establish an operating frequency which corresponds to the resonant frequency. The collector voltage of the switching transistor is monitored, and the transistor is switched only when the collector voltage is decreasing toward a minimum value and is below a predetermined reference level. This enables the power converter to operate at a high frequency, which affords small size, light weight, and high efficiency.

23 Claims, 6 Drawing Sheets

SELF-COMPENSATING SWITCHING POWER CONVERTER

BACKGROUND OF THE INVENTION

This invention relates generally to high voltage switching circuits, and more particularly to switching DC—DC high voltage power converters which are particularly useful, for example, for supplying power to cathode ray tubes, flat screen display devices, or other high voltage devices such as travelling wave tubes or X-Ray tubes.

Early high voltage power supplies were linear devices based upon the Royer design. These devices utilized a DC voltage to drive an oscillator which was connected to a high voltage transformer, the secondary of which supplied high voltage rectifiers and filters to produce the desired output DC voltage. These devices had relatively low power efficiency, in the order of 50–60%, and were rather large and bulky. This made them unsuitable for portable devices or for applications, such as in military aircraft, where weight and size are critical.

Advances in transistor reliability, integrated circuit drivers and magnetics, led to the abandonment of the inefficient linear designs in favor of driven switched high voltage power converters. Driven switched systems use integrated circuits to turn a switching transistor on and off to produce a time-varying voltage across the primary of a high voltage transformer. The secondary of the transformer, as in the linear design, is coupled to a high voltage rectifier and filter, and feedback is supplied to the switch driver for regulation purposes.

Switching high voltage power supplies operate at a relatively low frequency of the order of 30 kHz. The low frequency has been dictated by the necessity of allowing high voltage transients to die out before switching the transistor, in order to prevent damage or destruction of the transistor and other circuit components. The relatively low operating frequency necessitates rather large and bulky components. They are not well suited for battery operation, and their large size is still undesirable for either portable devices or where weight and size are important considerations.

It is not possible, with conventional switching power converters, to reduce the size of the inductors and capacitors to produce a lighter and smaller device, since this increases the operating frequency of the device, and increases the possibility of destruction of the switching transistor by causing it to operate during high voltage transients. Unfortunately, the resonant frequency of a switching power supply, which determines the transient response, is a function of many different variables, including load, temperature, and supply voltage.

While driving a conventional switched converter at a fixed frequency may work fine at one operating condition, the resonant-point will shift with load variations. A heavier load is required as when, for example, a display produces an all white raster. The result is that the resonant frequency decreases, and the operating frequency would thus have to be lower. As a result, conventional high voltage switching power converters have very low efficiencies over their normal operating range.

It is desirable to provide high voltage power supplies which can operate at high frequencies, in order to reduce their size and weight, by allowing a reduction in values and sizes of inductors and capacitors of the system, and which are capable of operating with high efficiency and at relatively low DC voltages such as used in portable integrated circuit devices. It is to these ends that the present invention is directed.

SUMMARY OF THE INVENTION.

The invention provides self-compensating resonant switching high voltage power converters which solve the foregoing and other problems of known high voltage power supplies. The power converters of the present invention achieve high efficiency over widely varying operating conditions, such as load, temperature and supply voltage, while having low weight and size. They are able to operate efficiently with low conventional battery voltages such as used in portable devices. The invention achieves these advantages, in part, by operating at a high frequency which is automatically adjusted in real time in accordance with variations in operating conditions in order to ensure that the switching devices always operates at the optimum point.

The invention automatically compensates for variations in input supply voltage, load and temperature, by sensing the actual voltage of the switching devices, and by controlling the switching to turn on or off at the appropriate time. This effectively tracks the resonant frequency of the converter in real time, and automatically adjusts its operating frequency to match. As a result, the invention can operate at high frequencies of the order of 300 Khz or higher, a factor of ten times the operating frequency of conventional fixed frequencies in converters. This results in a substantial size and weight reduction, of the order of five times, for example, making the invention ideally suited for providing power to displays in portable laptop computers, on military or other aircraft, or in any high voltage application where it is desirable to reduce the size and weight of the power supply.

The invention advantageously always seeks and operates at the resonant frequency of the circuit, and follows changes in resonant frequency with changes in operating loads and conditions. Moreover, the circuit employs a pulse width modulator type of driver, which is very efficient and very fast correcting. Moreover, the power converter of the invention will always start into any load, such as large capacitive loads which would cripple a linear design, and at any temperature, even where the beta of the switching transistor is extremely low.

In one aspect, the invention affords an apparatus and method for controlling a switching circuit which includes a switching device that switches between first and second operating states in which a voltage associated with the switching device that exhibits transient variations during switching is monitored, and the switching device is controlled to switch between operating states when the associated voltage obtains a predetermined relationship to a reference voltage.

More specifically, the switching device is controlled to switch between operating states when the associated voltage is decreasing toward a minimum value and is below a nominal operating voltage, and preferably when the associated voltage first decreases from a maximum to the predetermined relationship to the reference voltage.

In another aspect, the invention affords a high voltage power converter which includes means for transforming a primary time-varying voltage to a higher secondary time-varying voltage, in which transistor means connected to the transforming means is controlled to switch the current flow through the transformer means on and off to produce the time-varying voltage, and the switching voltage of the transistor means is monitored to control the transistor means to switch between states when the switching voltage attains a predetermined value.

DESCRIPTION OF THE PREFERRED EMBODIMENTS.

The invention is particularly applicable to high voltage power converters for supplying power to, for example, displays, in portable devices, and for use on aircraft, and will be described in that context. It will be appreciated, however, from the description which follows that the invention has broader utility to other high voltage switching circuits and devices.

Figure 1:
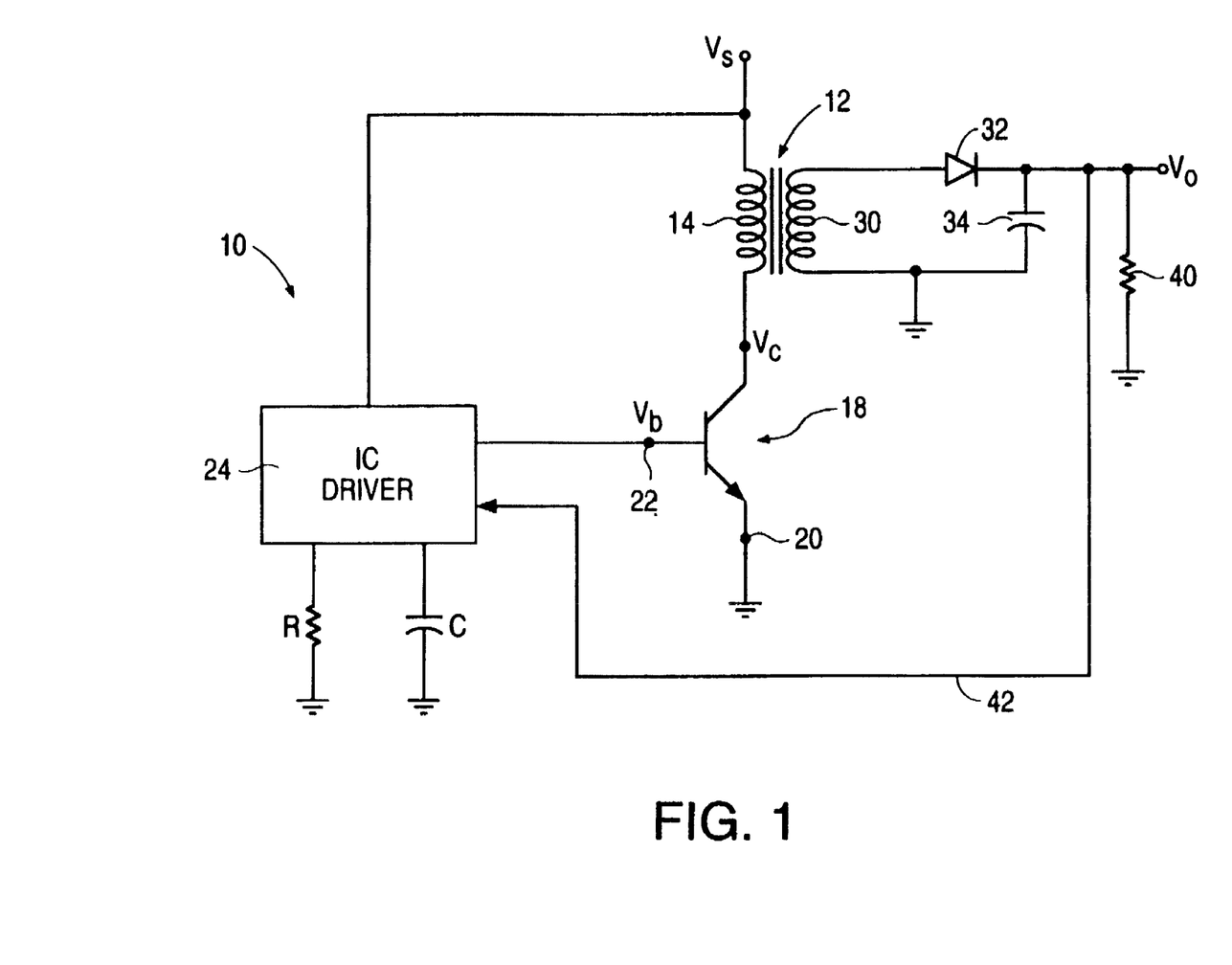
FIG. 1 is a schematic and block diagram illustrating a conventional fixed-frequency high voltage switching power converter circuit.

FIGS. 1 and 2 illustrate a conventional fixed frequency switching power converter of a known type, and will be described briefly since this will facilitate an understanding of the invention. As shown in FIG. 1, the principal components of a conventional power converter 10 comprise a high voltage transformer 12 having one side of its primary winding 14 connected to the supply voltage $V_s$ and the other side of the primary winding connected to the collector of a switching transistor 18. The emitter 20 of the switching transistor may be connected to ground, and the base 22 of the transistor may be driven by an integrated circuit (IC) driver 24. IC 24 may also be connected to the supply voltage $V_s$, and is used to turn switching transistor 18 on and off in order to produce a time-varying voltage across the primary of the transformer. The secondary 30 of the transformer supplies a high voltage rectifier 32, the output of which is connected to a filter, such as a capacitor 34 and supplies an output voltage $V_o$ to a load 40.

High voltage transformer 12 may have a step-up turns ratio, n, of the order of 100–1,000, for example, thereby converting a rather low peak-to-peak voltage across the transformer primary to a high output peak-to-peak voltage. The rectifier 32 converts the voltage across the transformer secondary winding to a uni-directional voltage, and the filter 34 smooths variations to produce a high voltage DC output $V_o$. A portion of the high voltage may be fed back via a feedback path 42 to IC driver 24 for voltage regulation purposes. IC driver 24 may be a conventional integrated circuit which produces an output pulse at a frequency controlled by a timing circuit comprising a resistor, R, and a capacitor, C. The timing circuit sets the operating frequency of the switching converter 10.

Figure 2A:
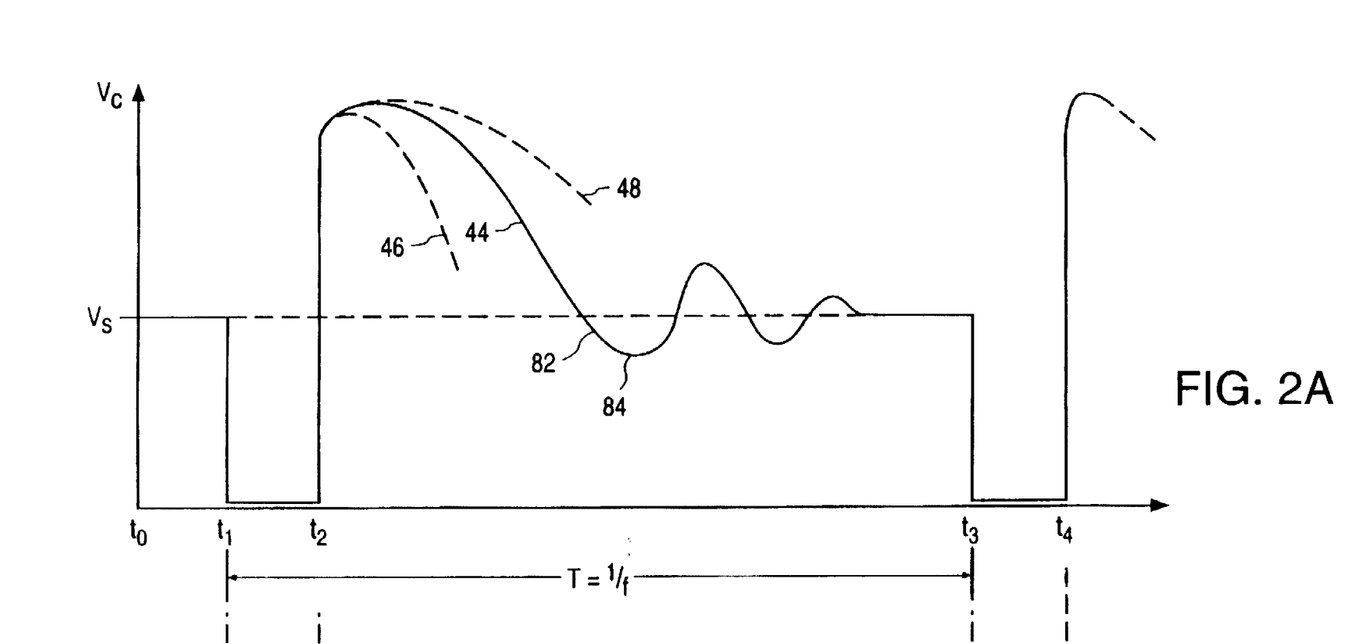
FIGS. 2A and 2B (together FIG. 2) illustrate voltage waveforms at certain locations in the circuit of FIG. 1.
Figure 2B:
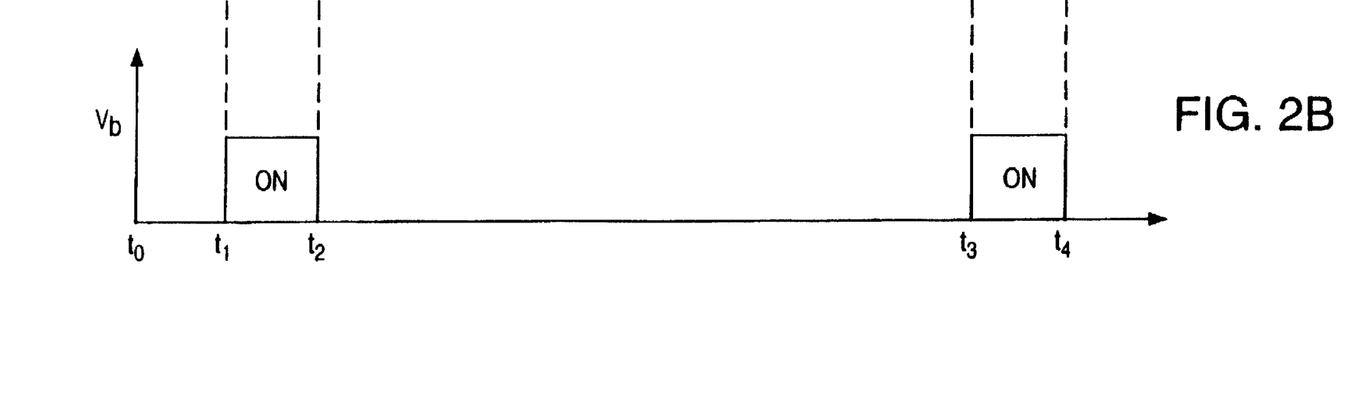

The operation of the switch converter 10 is illustrated by the waveforms of FIGS. 2. FIG. 2A illustrates the collector voltage Vc of transistor 18 as a function of time, and FIG. 2B illustrates the base voltage Vb of the transistor.

Referring to FIG. 2A, between the times $t_0$–$t_1$, it is assumed that transistor 18 is off. Accordingly, the voltage at its collector $V_c$ is equal to the supply voltage $V_s$. At $t_1$, a voltage pulse $V_b$ is applied to the base of the transistor by the IC driver 24. This forward biases the base-emitter junction of the transistor, turning it on at time $t_1$. When the transistor turns on, its collector voltage $V_c$ drops to approximately zero, as shown in FIG. 2A. Between times $t_1$ –$t_2$, the IC driver 24 applies the voltage pulse to the transistor base 22, maintaining the transistor in a conductive state. This occurs by the IC driver outputting a voltage pulse to the base having a pulse width of $t_2$–$t_1$, as shown in FIG. 2B. At $t_2$, the output pulse from the IC driver goes to zero, causing the base voltage to likewise go to zero, and turns the transistor off. This interrupts the current flow through the primary of the transformer, producing an induced voltage $V_i$ =L(di/dt), where L is the inductance and di/dt is the rate of change of current through the primary as a function of time. This is illustrated in FIG. 2A where, at time $t_2$ the collector voltage $V_c$ jumps to a voltage $V_i$, which may be substantially higher (about twice, for example) than the supply voltage $V_s$. The induced voltage then begins to decay as a periodic time-varying voltage, as shown at 44, to a level equal to the supply voltage, producing damped ringing and transient effects as illustrated.

The rate of decay of the voltage 44 at the collector of the transistor is a function of a number of different parameters, including the load, the temperature, and the supply voltage, and the decay is greatly affected by these parameters. As illustrated in FIG. 2A, under normal operating conditions, the rate of decay may vary from a fast decay, as shown by the dotted line 46, to a substantially longer delay, as illustrated by the dotted line 48. In order to accommodate such widely varying decay rates as may be encountered in normal operations, it has been necessary in conventional switching converters to hold the transistor in an off condition for a sufficiently long period of time to ensure that the transient effects associated with the longest anticipated decay, corresponding to the lowest resonant frequency, have died out. This is to avoid turning the transistor on at a time when its collector voltage is either at a high level or increasing, which can damage or destroy the transistor. Thus, the operating frequency of the IC driver had to be set to produce an operating period, T, corresponding to the longest anticipated time to enable the transient effects to die out. This is illustrated in FIG. 2A as the time interval T between $t_1$ and $t_3$. At $t_3$, the IC driver outputs a second pulse, as shown in FIG. 2B, to turn the transistor on again until $t_4$, and the cycle repeats. With such conventional switching power converters, the operating frequency, must typically be set rather low, e.g., 30–40 kHz, in order to provide a sufficiently long time between operating cycles to accommodate the anticipated variations in transient response of the switching converter due to variations in operating parameters. The necessity of operating at a lower frequency, f, than desirable results in inefficiency as well as large size and weight because of the size and weight of the magnetics and other components required.

The invention avoids such problems of conventional fixed-frequency power converters by providing a new self-compensating resonant frequency switching power converter that automatically adjusts its frequency of operation dynamically and in real time in order to operate at the resonant frequency of the converter circuit as it varies during its actual operating conditions. This enables the invention to operate at a substantially higher frequency, e.g., 300 kHz, which is a factor of 10 higher than a conventional switching power converter. This is possible since the rather long voltage decays illustrated in FIG. 2A which dictate the long cycle time and low frequency of operation of a conventional switching converter occur rather infrequently, but nevertheless must be accommodated in a conventional device. Since the invention actually tracks the resonant frequency and adjusts its operation accordingly, it is able to operate at sustained high frequencies for a substantial part of the time, thereby providing substantially higher operating efficiency.

As will be described shortly, the invention also employs a pulse width modulator type of driver, which is a very efficient and very fast correcting driver. Moreover, a power converter in accordance with the invention will always start into any load, even large capacative loads which would cripple a linear supply or conventional switching supply and over wide temperature and supply voltage ranges. Significantly, the invention can operate with very high efficiency at low battery voltages of the order of 3.3 volts, for example, which are used in some of the newer integrated circuit devices. This is something that conventional devices cannot do.

The problem addressed by the invention may be analogized to the operation of a mass, i.e., block, suspended by a simple spring. When the mass is pulled down and released, it undergoes an oscillatory motion, up and down, with a damped frequency determined by the spring constant and the mass of the block itself. The best place in the cycle to add energy to such a system is to pull the mass down while it is naturally heading in that direction during part of its cycle. It would be inefficient to tug the mass downwardly to add energy as it was heading upwardly. This is analogous to what happens in a conventional high voltage switching power supply where the driver is out of synchronization with the needs of the resonant circuit. As will now be described, the invention monitors the actual operating condition, and adds energy to the system at the appropriate time to achieve high efficiency and high operating frequency.

Figure 3:
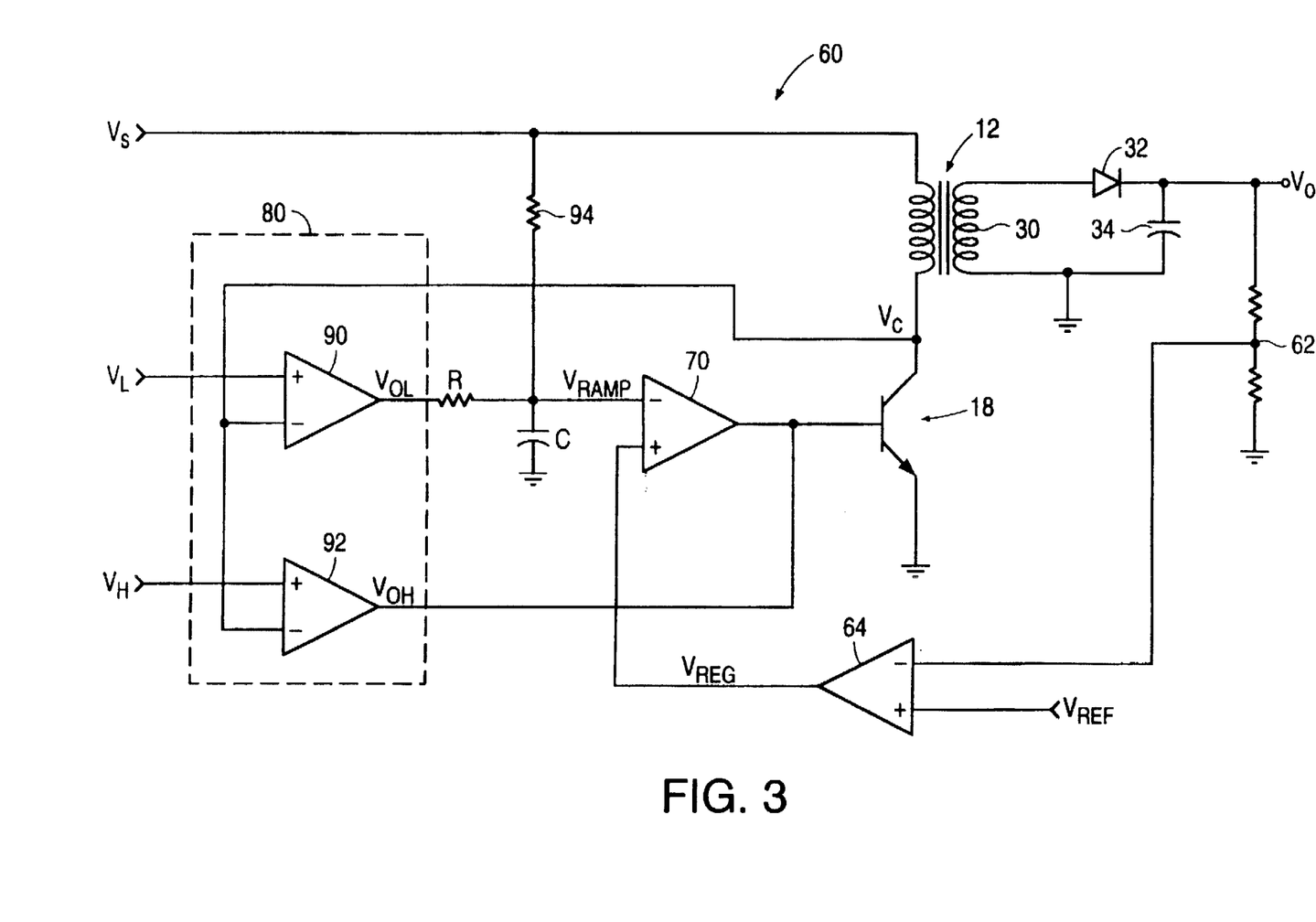
FIG. 3 illustrates a self-compensating resonant high voltage switching power converter in accordance with the invention.

FIG. 3 illustrates a high voltage switching power converter 60 embodying the invention. As with a conventional fixed frequency switching converter, a switching device, such as a transistor 18 or other voltage controlled switch, e.g., an SCR, drives a high voltage step-up transformer 12. The secondary winding 30 of the transformer supplies a high voltage rectifier 32 and filter capacitor 34 to provide the output voltage $V_O$. A voltage divider 62 samples the output voltage and feeds back the sample voltage to a voltage regulator 64, which may comprise an operational amplifier (op amp). The sample voltage from the voltage divider 62 may be provided to the inverting (−) terminal of the op amp, and a reference voltage $V_{ref}$ may be supplied to the non-inverting (+) terminal of the op amp. The output of the op amp supplies a voltage $V_{reg}$ to a switch driver 70 for switching transistor 18. As will be described shortly, the output voltage $V_{reg}$ provides a separate control signal to the switch driver 70 to regulate the output $V_O$ from the high voltage regulator to a predetermined value. Driver 70 may compromise a comparator which compares a control voltage in the form of a ramp ($V_{ramp}$) to the output voltage from the voltage regulator to turn the switching transistor 18 on and off.

In accordance with the invention, a sensing and controlling circuit 80 is provided for monitoring the collector voltage $V_c$ of switching transistor 18, and for controlling the switch driver 70 so that power is added by switching transistor 18 only when the collector voltage is in a predetermined voltage range. The sensing and control circuit 80 preferably prevents switching transistor 18 from turning on to add power whenever the collector voltage is increasing or above a predetermined value. This prevents the transistor from attempting to add power while the ringing voltage induced across the transistor primary, as described in connection with FIG. 2, is high and could cause damage or destruction to the switching transistor or other components of the power converter. Ideally, it is desirable to turn the switching transistor on when the collector voltage is decreasing below the level of the supply voltage during ringing. This corresponds to the region indicated at 82 in FIG. 2A when the collective voltage is between the supply voltage $V_s$ and a minimum voltage value 84. Ideally, it has been found that the optimum point to turn the transistor on is at a phase angle of about 10° past the midpoint ($V_s$) while the collector voltage is decreasing. It is undesirable to turn the transistor on while the collector voltage is increasing, such as while the voltage is ringing up from the minimum point 84 in FIG. 2A. FIG. 3 illustrates one form of a control and sensing circuit in accordance with the invention which accomplishes this.

As shown, the control and sensing circuit 80 may comprise a pair of comparators 90 and 92, which sense the collector voltage $V_c$ of switch 18, or some other voltage which is associated with the transistor on their inverting (−) inputs, and compare the collector voltage to two different reference voltages. $V_L$ and $V_H$. Reference voltage $V_H$ is higher than reference voltage $V_L$, and the voltages determine a voltage range during which the switch can turn on. In a preferred embodiment, the upper and lower reference voltages may be above and below, respectively, the supply voltage. $V_s$, which establishes a control range about the supply voltage for the switch. For example, for military applications, a supply voltage of 28 volts is common. In this case, $V_L$ may be set at 27 volts, and $V_H$ may be set at 29 volts, for example, thereby establishing a 2 volt control range about the supply voltage.

Figure 4A:
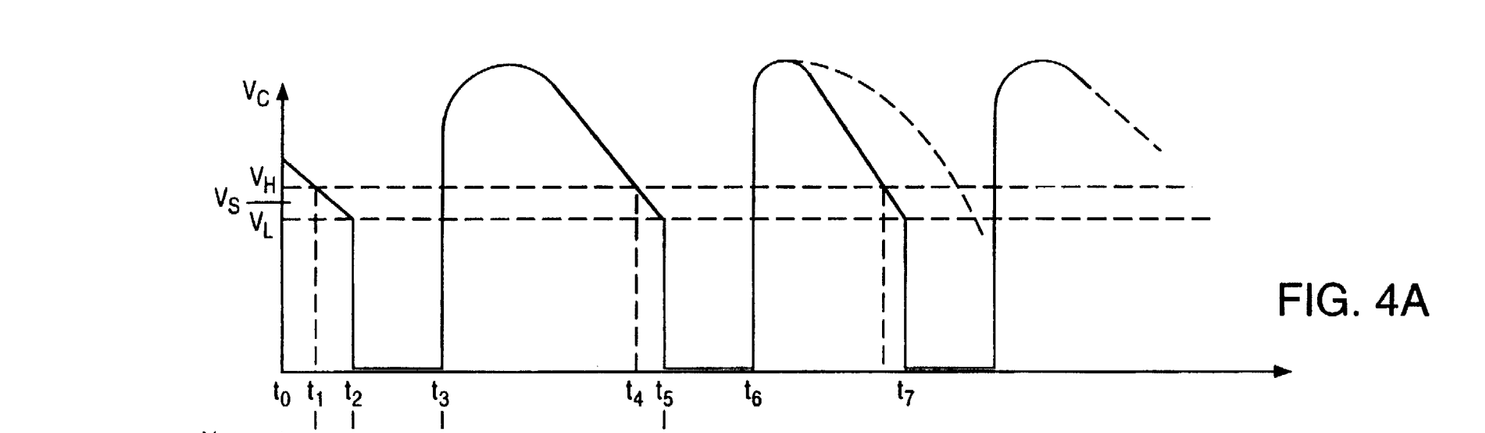
FIGS. 4A–D (collectively FIG. 4) illustrate voltage waveforms as a function of time at various points in the circuit of FIG. 3.
Figure 4B:
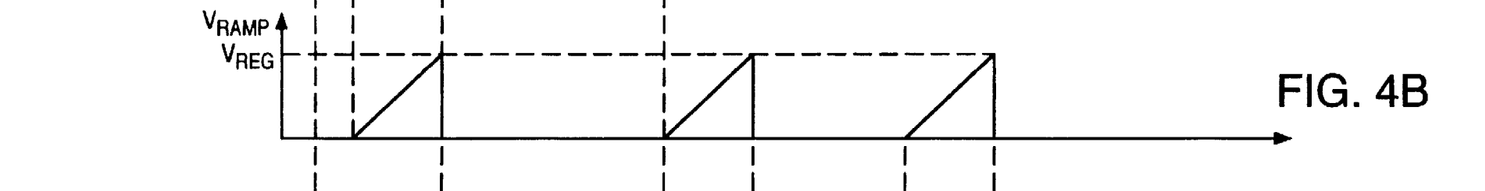
Figure 4C:
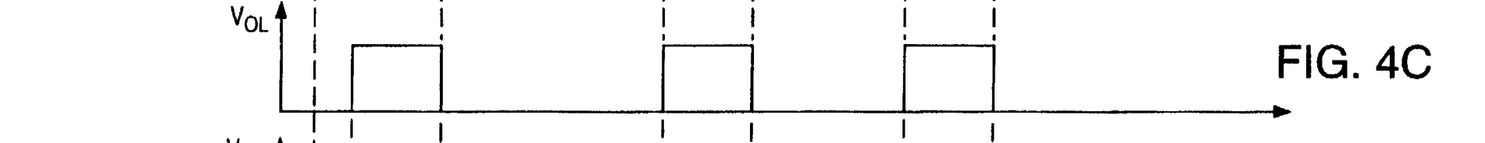
Figure 4D:
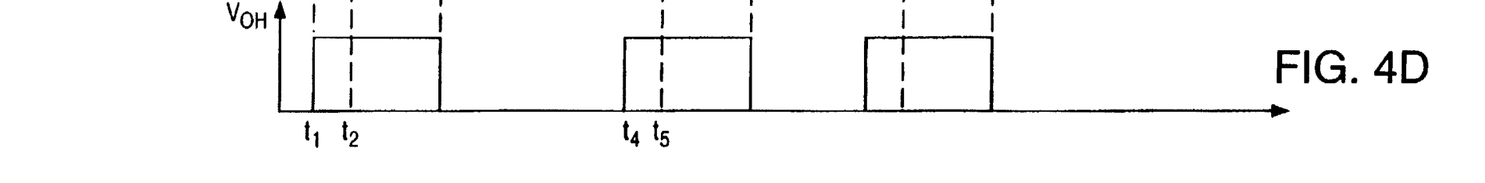

As shown in the figure, $V_H$ may be supplied to the non-inverting (+) terminal of comparator 92, and the output of the comparator may be connected to the base of switching transistor 18, as shown. The lower referenced voltage $V_L$ may be connected to the non-inverting input of comparator 90, and, the output of the comparator may be connected through a resistor, R, to the inverting input-of comparator 70. The inverting input of comparator 70 is also connected through a capacitor, C, to ground, and to another resistor 94 connected to the supply voltage, as shown. As will be described shortly, the input voltage to the inverting input of comparator 70 is a ramp voltage having a time constant determined by the value of resistor R and capacitor C. The ramp voltage is used to control the on-time of transistor switch 18, as will be described. FIGS. 4 A–D illustrate voltage waveforms at various points in the converter circuit 60 of FIG. 3, and are useful for explaining the operation of the invention. FIG. 4A shows the collector voltage $V_c$ of the transistor switch. FIG. 4B illustrates the ramp voltage $V_{ramp}$ on the inverting input of comparator 70; and FIGS. 4C and 4D illustrate, respectively, the output voltages $V_{OL}$ and $V_{OH}$ of the under and over voltage comparators 90 and 92, respectively. When the collector voltage is above the higher voltage reference level $V_H$, the output voltage $V_{OH}$ of the overvoltage comparator 92 is low, thereby keeping the base voltage $V_b$ on transistor 18 low and maintaining the transistor turned off. Thus, as shown in FIG. 4, between times $t_o$ and $t_1$, when the collector voltage $V_c$ is above, $V_H$, the output voltage $V_{OH}$ of comparator 92 is low and, consequently, transistor 18 is turned off. During this period of time, the output voltage $V_{OL}$ of comparator 90 is also low, as shown in FIG. 4C, since the collector voltage is higher than the lower reference voltage $V_L$. At time $t_1$, the collector voltage $V_c$ goes below $V_H$ as shown in FIG. 4A, thereby causing the output voltage $V_{OH}$ of comparator 92 to go high, as shown in FIG. 4D. However, the output voltage $V_{OL}$ is also low at this time and remains low until time $t_2$ when the collector voltage drops below the lower referenced voltage $V_L$. As long as the output voltage of comparator 90 is low, this prevents the capacitor C from charging and maintains the ramp voltage $V_{ramp}$ low on the inverting input of comparator 70, which prevents transistor 18 from turning on. At time $t_2$, when the collector voltage drops below the lower reference $V_L$, the output voltage $V_{OL}$ of comparator 90 goes high and capacitor C begins to charge. This produces a ramp voltage $V_{ramp}$ (shown in FIG. 4B) to comparator 70. This causes the output of comparator 70 to go high, and, accordingly, the base voltage $V_b$ to go high, turning on switching transistor 18. When the transistor turns on, the collector voltage goes low, allowing current to flow through the primary of transformer 12. Transistor 18 conducts until time $t_3$, at which point the ramp voltage becomes equal to the output control signal, $V_{reg}$, from voltage regulator 64. At this time, the output of the comparator goes low, turning transistor 18 off. This allows the collector voltage to rise quickly to a level substantially higher than the supply voltage, typically about twice the supply voltage, as shown in FIG. 4A. The collector voltage then begins to decrease, as shown. At time $t_3$, as the collector voltage rings up above both $V_L$ and $V_H$, the outputs of comparators 90 and 92 both go low, as shown in FIGS. 4C-D. When $V_{OL}$ goes low, this discharges capacitor C.

Between times, $t_3$ and $t_4$, the collector voltage decreases, as shown. At $t_4$, when the collector voltage goes below the higher reference voltage $V_H$, the output from the over voltage comparator, 92, goes high, as shown in FIG. 4D. However, since the output of comparator 70 is still low, this holds the base voltage $V_b$ low, preventing transistor 18 from turning on. At time $t_5$, when the collector voltage decays to the lower reference voltage $V_L$, the output of the undervoltage comparator 90 goes high, allowing capacitor C to begin to charge and turning on transistor 18. As the capacitor charges, the voltage ramp at the input of comparator 70, maintains transistor 18 conductive, as previously described, until the ramp reaches the output of the voltage regulator, at which time the transistor is turned off and the cycle repeats.

As previously explained the resonant frequency of the switching power convertor determines the rate of decay and the ringing characteristics of the time-varying periodic voltage at the collector of the transistor. The resonant frequency, as previously described, is determined in part by the equivalent inductances and capacitances in the primary and secondary circuits of the power supply, and is a function of a number of different variables, including the load, temperature and the supply voltage. However, as can be seen from the foregoing, the invention, by sensing the time-varying current through the transformer primary winding, as reflected by the collector voltage, and by controlling the switching transistor as a function of the collector voltage, the invention enables power to be added to the primary at the optimum point in the decay cycle and at the optimum time to ensure high efficiency. Moreover, the invention automatically compensates and adjusts the switching of the transistor to track changes in resonant frequency in real time, since any changes in resonant frequency are reflected as a change in the decay rates and ringing characteristics of the transistor collector voltage. Thus, the invention automatically tracks the resonant frequency and corrects its frequency of operation in accordance with changes in resonant frequency. This is illustrated, for example, in FIG. 4A, where, at time $t_6$ it is assumed that the resonant frequency increases, thereby allowing faster ringdown and decay between $t_6$ and $t_7$ of the collector voltage. This allows the transistor to turn on in a shorter period of time, at $t_7$, than it did in the previous cycle between $t_3$ and $t_5$. Thus, the switching frequency of operation increases as the resonant frequency increases. Moreover, since the actual collector voltage is monitored and the transistor switching is controlled at predetermined voltage levels, the invention can insure that the transistor is always turned off at the optimum time to avoid damage or destruction of the transistor and to insure that the appropriate amount of power is supplied to the transformer primary with the optimum efficiency. Therefore, the invention can operate at a substantially higher frequency than conventional fixed frequency switching power convertors which must set their operating frequencies low enough to insure that any ringing in the collector circuit has died out before the transistor is turned on. Thus, the invention enables substantially smaller inductors and capacitors than conventional circuits, and this permits a reduction in size of weight by a factor of five or more. As can also be seen from the foregoing, the invention by using feed forward techniques, insures a faster response than conventional circuits, and the circuit will always start whenever the control point is higher than the ramp voltage at comparator 70, since transistor 18 will always turn on.

Figure 5:
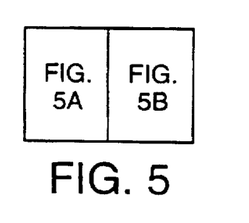
FIGS. 5, 5a, and 5b are a more detailed schematic diagram of a self-compensating resonant high voltage switched power converter in accordance with the invention.
Figure 5A:
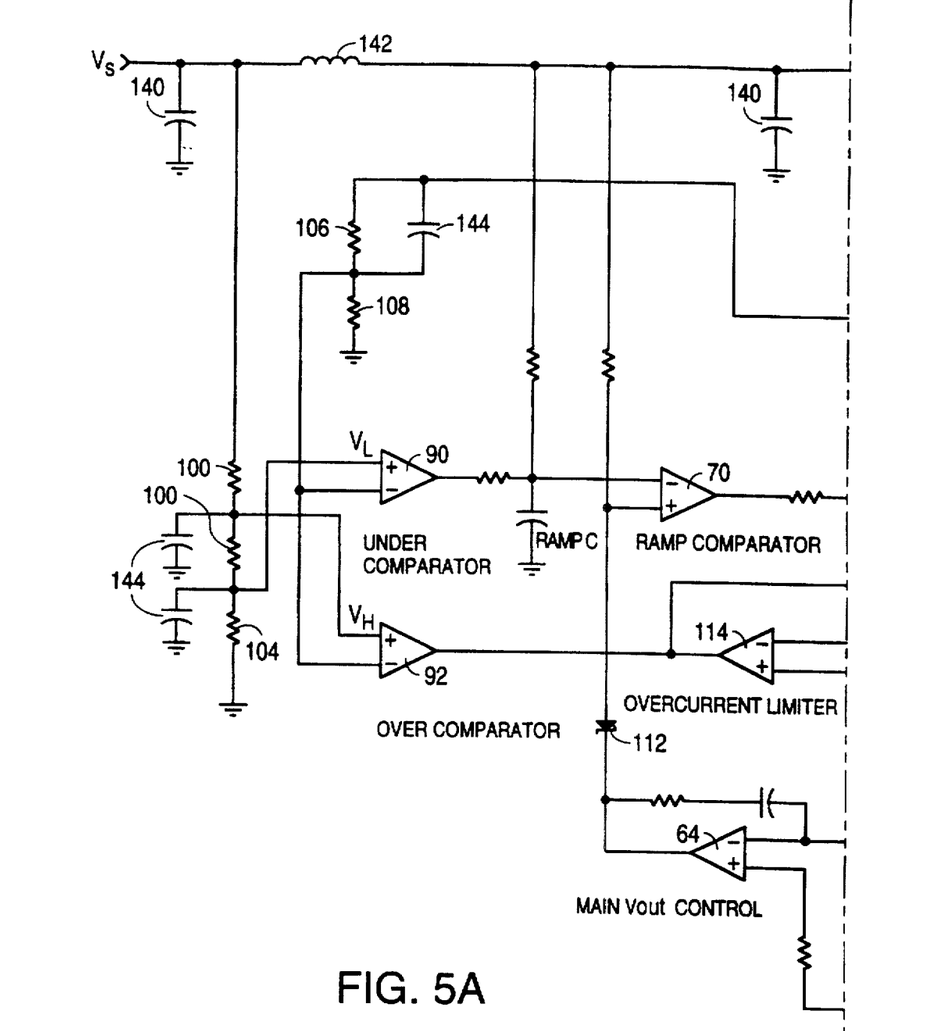
Figure 5B:
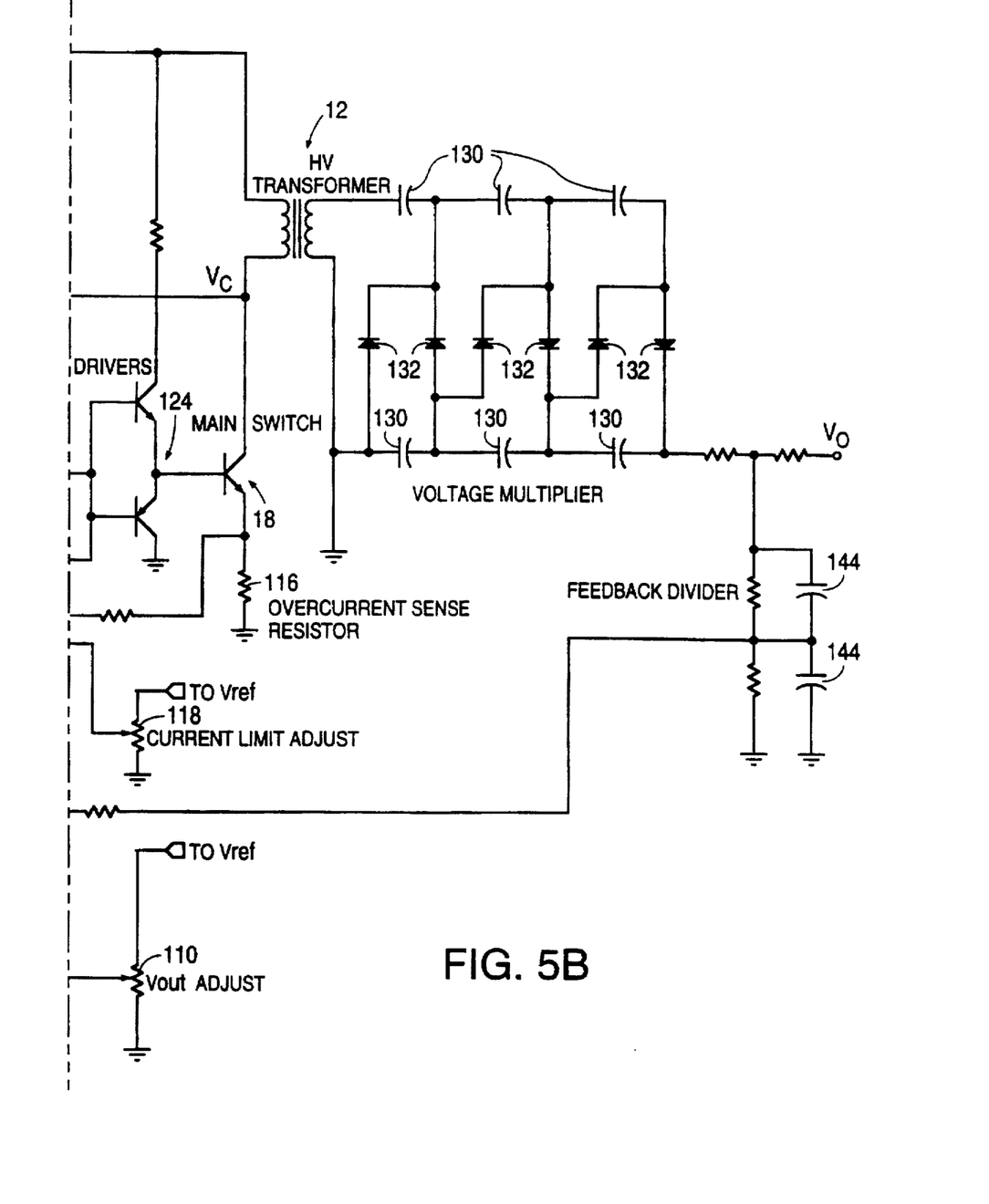

FIGS. 5, 5a and 5b illustrates another embodiment of a self-compensating resonant frequency switching power convertor in accordance with the invention. The power convertor of FIG. 5 is substantially similar to the embodiment of FIG. 3, but advantageously provides for self-compensation of the converter with varying supply voltages. This can be a substantial advantage in, for example, mobile operations as encountered typically in military applications. In such cases, a nominal 28 volt supply may vary between 22 to 38 volts. The power convertor of FIGS. 5a and 5b automatically compensates for changes in supply voltage by automatically adjusting its reference voltages and operating point.

Referring to FIG. 5a where like reference numerals are used to designate similar components to those in FIG. 3, the lower and higher reference voltages $V_L$ and $V_H$ applied to the under and over comparators 90 and 92, respectively, may be derived from a voltage divider network comprising resistors 100, 102, and 104, connected in series between the supply voltage and ground. A second voltage divider comprising resistors 106 and 108 connected in series between the collector voltage of transistor 18 and ground are used to derive a sample of the collector voltage for comparators 90 and 92. By selecting the values of the resistors 100-108 in the two voltage divider networks, the relative operating voltages of the two comparators can be established and referenced to the supply voltage $V_s$. If, for example, the supply voltage is 28 V, nominally, the collector voltage $V_c$ in a quiescent state with the transistor off would be equal to the supply voltage of 28 V. By selecting resistors 106 and 108 to be of equal value, the reference level for the collector voltage to the comparators 90 and 92 can be set, for example, at 14 V, nominally. The values of resistors 100-104 are similarly selected to provide the desired high and low reference voltages to the over and under comparators. If, for example, resistors 100 and 104 are made equal in value, and resistor 102 is selected to have a value which is relatively small compared to that of resistors 100 and 104, resistor 102 establishes a small dead zone which determines the differential between the upper and lower referenced voltages $V_L$ and $V_H$. For example, assuming that supply voltage is 28V, by selecting resistors 100 and 104 to be 1 Kohm, and resistor 102 to be 100 ohms, the higher voltage reference $V_H$ to comparator 92 will be 14.6 V, and the lower voltage reference $V_L$ to comparator 90 will be 13.3V, establishing approximately a 1.3V range between the upper and lower reference voltages. Moreover, since the reference voltages to comparators 90 and 92 are derived by the two voltage divider networks as a portion of the supply voltage, any variations in the supply voltage would be reflected as variations in the absolute values of the reference voltages. However, their relative values would remain constant, thereby enabling the operating point of the circuit to automatically compensate for changes in supply voltage. This stabilizes the circuit and provides faster correction in operating point. Moreover, since the ramp voltage to comparator 70 is also referenced to the supply voltage, if the supply voltage increases, this will change the slope of the ramp voltage, thereby varying the charging rate of capacitor C to charge it faster. This decreases the transistor on-time, which is appropriate, since with a higher supply voltage, the transistor does not need to be on as long to transfer a given amount of power to the transformer.

The connecter circuit of FIGS. 5a and 5b may also include a variable resistor 110 on the input to voltage regulator 64, which conveniently allows the output voltage from the power supply to be adjusted by adjusting the control voltage to the ramp comparator 70. A Schott key diode 112 connected between the output of the voltage regulator 64 and the comparator 70 insures fast pull-down of the ramp voltage upon switching of the transistor. In addition, the circuit of FIGS. 5a and 5b may include an overcurrent limiter comprising a comparator 114 which senses the current flow in a sense resistor 116 connected between the emitter of switching transistor 18 and ground. When the current flow through the sense resistor 116 exceeds a predetermined value, determined by the setting of a reference voltage to comparator 114 by a variable resistor 118, the output of the comparator goes low, which turns off the transistor. This is advantageous for preventing destruction of the transistor in the event of a short circuit or other malfunction.

Other differences in the circuit of FIG. 5 include a pair of transistors connected as a differential driver 124 between comparator 70 and the base input of switching transistor 18, and a voltage multiplier comprising a plurality of capacitors 130 and diodes 132 to step up the output voltage at the secondary of the transformer. High voltage transformer 12 may comprise, for example, a 100:1 step-up ratio. Other additions may include filter capacitors 140 and an inductor 142 on the supply voltage line, and bypass capacitors 144 around various ones of the resistors in the divider networks which improve noise performance.

In other embodiments of the invention, the high voltage transformer may be replaced, for example, by a piezoelectric ceramic transformer, for example, of PZT-8 ceramic or lithium niobate. Piezoelectric transformers can carry very high voltages, and have the advantage of being small and lightweight. By varying the length to width ratio of a bar of a ceramic piezoelectric material, a voltage ratio of 1000 times can be easily achieved.

Also, a different form of sensing and control network 80 illustrated in FIGS. 3, 5a and 5b may be employed. As indicated earlier, the optimum time to apply power to the primary of the convertor transformer is when the voltage transient is decreasing below the supply voltage during its ringdown. Thus, the sensing and control circuit 80 could be replaced with a slope detector, e.g., a differentiator, which detects a decreasing voltage in combination with a voltage level comparator so that the switching transistor is turned off at a point in its operating cycle where its collector voltage is within a predetermined voltage range, such as region 83 shown in FIG. 2.

From the foregoing, it can be appreciated that the invention affords switching power convertors having significant advantages over known fixed-frequency switching convertors. The invention can operate at substantially higher frequencies than conventional convertors, for example, 300 kHz or higher, as compared with an operating frequency of the order of 30 Khz for conventional switching regulators. This results in significantly smaller size and lighter weight, since large inductors and capacitors are not required to insure a low operating frequency as in conventional switching regulators. This makes the invention ideally suited for portable devices, such as for powering field emission displays or the like in laptop computers. Moreover, the invention can operate at low battery voltages of the order of 3.3 V as is typical of some of the newer integrated circuit technologies. The invention also is applicable for other high voltage applications such as powering traveling wave tubes, cathode ray wave tube displays, or x-ray tubes, as well as in applications requiring small size and lightweight as on military aircraft.

While the foregoing has been with reference to particular embodiments of the invention, it will be appreciated that changes in these embodiments may be made without departing from the principles and the spirit of the invention, the scope of which is defined in the appended claims.

I claim:

1. An apparatus for controlling a switching circuit driving a load, the circuit including a switching device that switches between on and off operating states, comprising means for monitoring a device voltage across the switching device, said device voltage exhibiting transient variations having peak values and minimum values about a supply voltage upon said switching and having a frequency which depends on a resonant characteristic of the switching circuit and the load; and means for controlling the switching device to switch the switching device on when said device voltage decreases from a peak value towards a minimum value.

2. The apparatus of claim 1 further comprising means for establishing another reference voltage, and wherein the control means switches the switching device between states only when said device voltage decreases below both of said reference voltages.

3. The apparatus of claim 2, wherein said reference voltages are established such that one reference voltage is above a nominal supply voltage and the other reference voltage is below said nominal supply voltage.

4. The apparatus of claim 3, further comprising means for producing said reference voltages so that their relationship to one another remains substantially constant with variations in the supply voltage.

5. The apparatus of claim 1, wherein said apparatus comprises a power converter for supplying power, the power converter having transformer means for transforming a first voltage to an output voltage, and wherein said switching device comprises a switching transistor connected to said transformer means for alternately enabling current flow and for interrupting current flow through said transformer means in accordance with its operating state.

6. The apparatus of claim 5, wherein said device voltage comprises the collector voltage of the switching transistor, and wherein said transient characteristics of said collector voltage have a time-varying ringing characteristic and a frequency related to a resonant frequency of the converter.

7. The apparatus of claim 1, wherein said switching device switches when said device voltage is below said predetermined reference voltage and is decreasing in value.

8. The apparatus of claim 1, wherein the transient variations of said device voltage has damped oscillations about said predetermined voltage and said switching device switches when said device voltage first changes from an initial peak value to said first-mentioned predetermined reference voltage in order to determine a conduction time for said switching device.

9. The apparatus of claim 8, wherein said operating states of said switching device comprise a conducting state and a non-conducting state, said switching device switching to said conducting state upon said device voltage being below said first-mentioned reference voltage and decreasing in value and switching to said non-conducting state when said device voltage is above said first-mentioned reference voltage.

10. The apparatus of claim 1, wherein said frequency varies in accordance with changes in the load and said means for controlling said switching device adjusts to the variations in said frequency.

11. A high voltage power converter comprising means for transforming a primary time-varying voltage to a higher secondary time-varying voltage driving a load; switching means connected to the transforming means for switching current flow to the transforming means on and off to produce said primary time-varying voltage; means for monitoring a device voltage across said switching means upon switching, said device voltage exhibiting transient variations having peak values and minimum values about a supply voltage and having a frequency which depends upon a resonant characteristic of the switching circuit and the load; and means, responsive to the monitoring means, for controlling the switching means to switch on when said device voltage decreases from a peak value towards a minimum value.

12. The converter of claim 11, further comprising means for establishing first and second reference voltages about a nominal operating voltage, and wherein said controlling means controls the switching means to switch states when said switching voltage decreases below both said first and second reference voltages.

13. The converter of claim 12, wherein said device voltage has a periodic time-varying characteristic, and wherein said controlling means controls the switching means to switch states when said device voltage has a phase angle on the order of 10° below said nominal operating voltage.

14. The converter of claim 12 further comprising voltage divider means for establishing said first and second reference voltages with respect to said nominal operating voltage so that the relationship between said reference voltages remains substantially constant with variations in the nominal operating voltage.

15. The converter of claim 11, wherein said device voltage has a transient ringing characteristic, and wherein said control means controls the switching means to change states when the device voltage first decreases from an initial peak value to said predetermined value in order to achieve a high power transfer efficiency.

16. The apparatus of claim 11, wherein said switching device switches when said device voltage is below said predetermined reference voltage and is decreasing in value.

17. A method of controlling a switched power converter attached in which a switching device is switched between first and second states to apply power to an output circuit, comprising monitoring a voltage across the switching device, the device voltage exhibiting transient variations having peak values and minimum values about a supply voltage upon said switching and having a frequency which depends on a resonant characteristic of the switching circuit and the output circuit, and controlling the switching device to switch on when said device voltage decreases from a peak value towards a minimum value.

18. The method of claim 17, wherein said switching device switches when said device voltage is below said predetermined reference voltage and is decreasing in value.

19. The method of claim 17 further comprising establishing another reference voltage, and controlling the switching device to switch when said associated voltage decreases below both of said reference voltages.

20. The method of claim 19, wherein said reference voltages are established above and below a nominal supply voltage, and are referenced to said supply voltage such that the relationship between the reference voltages remain substantially constant during variations in said supply voltage.

21. The method of claim 20, wherein said switching device is controlled to switch states when said device voltage has a phase angle of the order of 10° relative to the supply voltage.

22. The method of claim 17, wherein controlling said switching device comprises changing the states of the switching device when the device voltage first decreases from an initial peak value to said predetermined value in order to afford a high switching frequency.

23. An apparatus for controlling a switching circuit driving a load, the circuit including a switching device that switches between first and second operating states, comprising means for monitoring a device voltage across the switching device, said device voltage exhibiting transient variations upon said switching having a resonant frequency which depends on a resonant characteristic of the switching circuit and the load and varies in response to changes in the load; and means for controlling the switching device to switch between operating states at the resonant frequency.

\* \* \* \* \*